April 20, 1954 T. E. D. BILDE ET AL 2,676,088
METHOD OF WASHING, RINSING, AND SQUEEZE DRYING CLOTHES
Filed June 30, 1949 6 Sheets-Sheet 1

INVENTORS
ATTORNEY

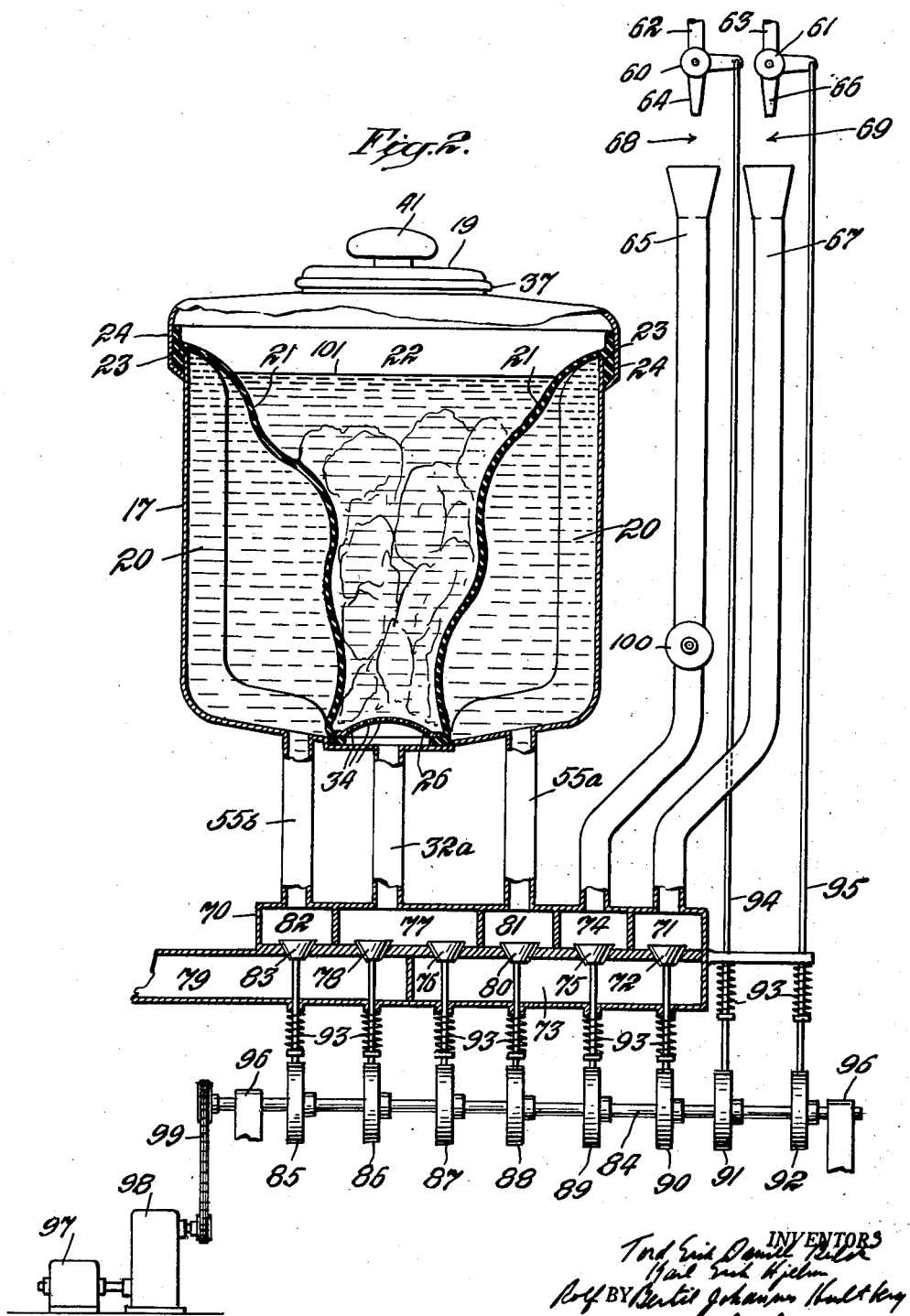

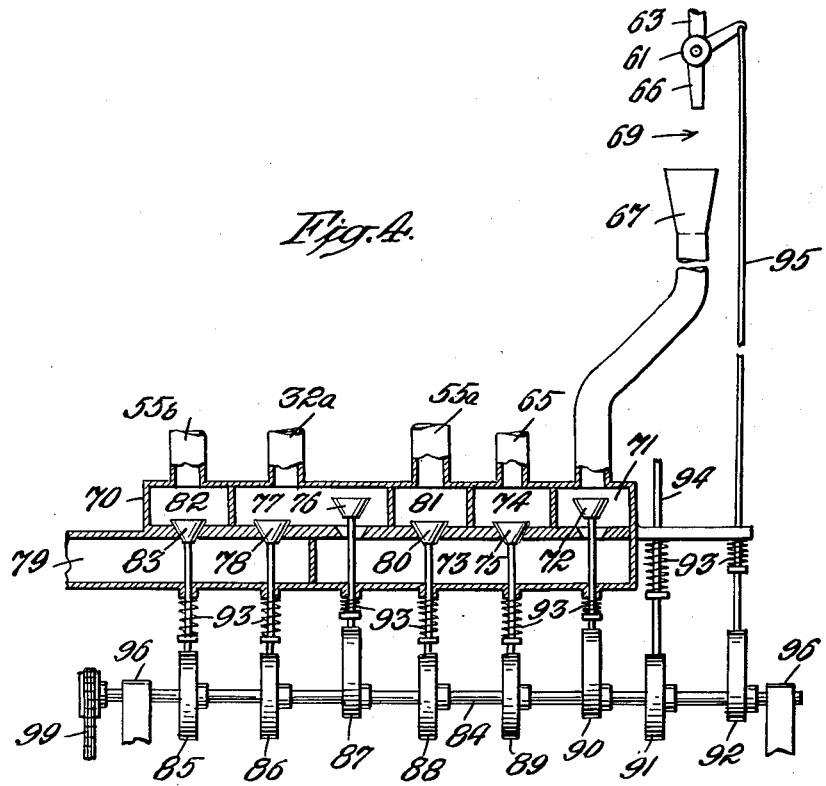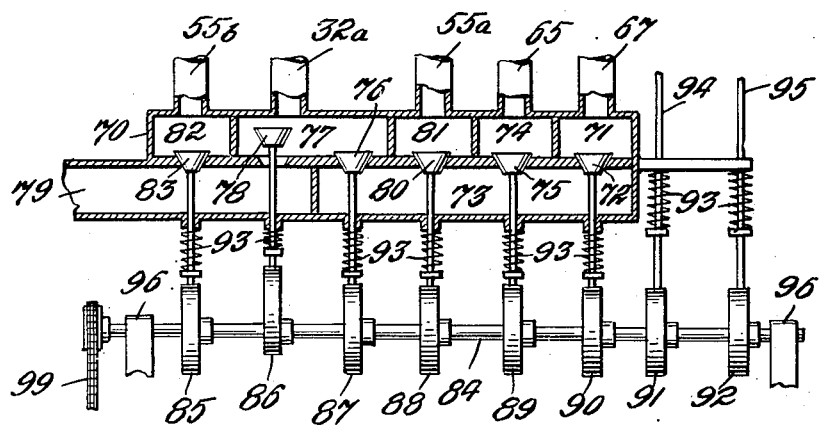

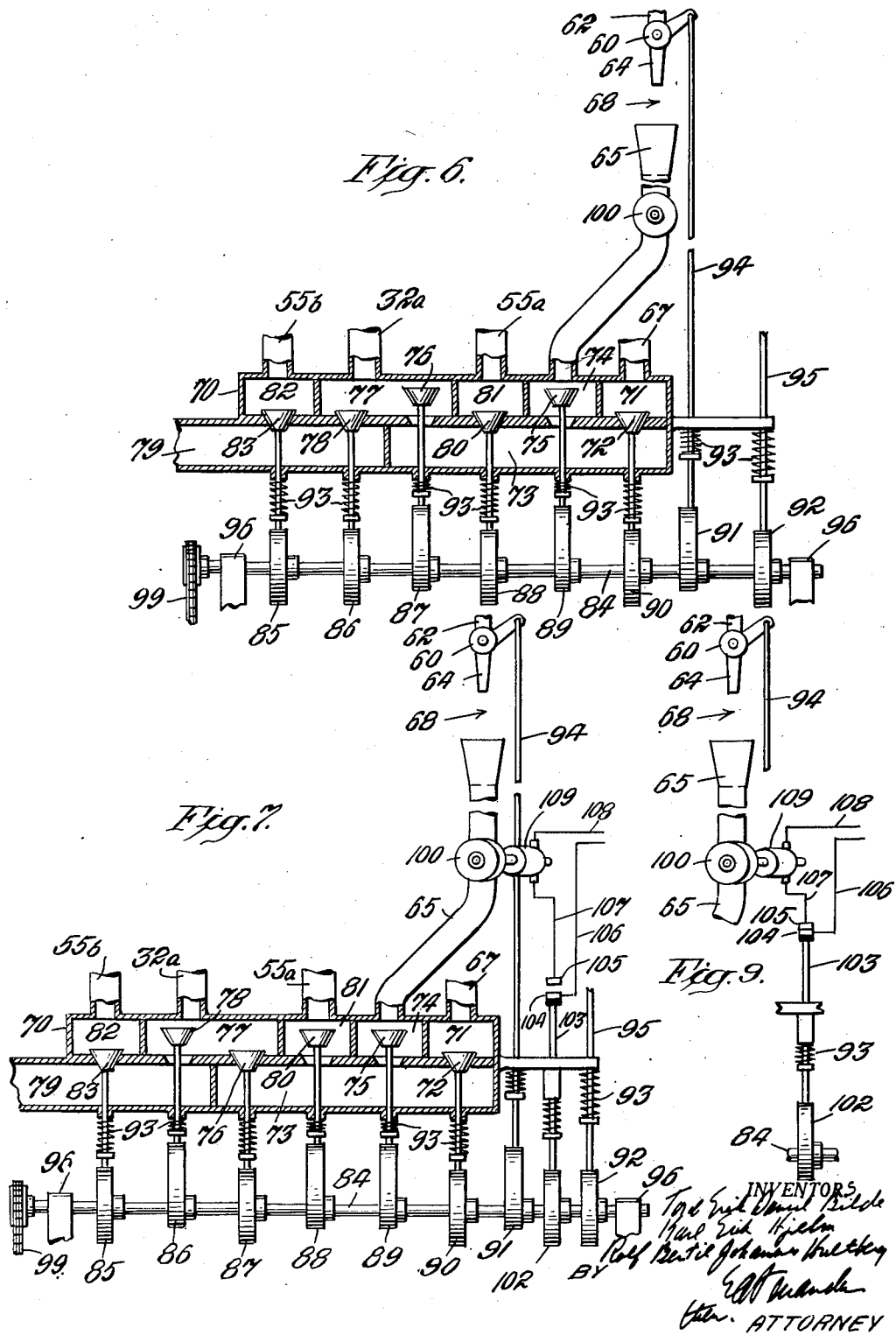

April 20, 1954  T. E. D. BILDE ET AL  2,676,088
METHOD OF WASHING, RINSING, AND SQUEEZE DRYING CLOTHES
Filed June 30, 1949  6 Sheets-Sheet 5
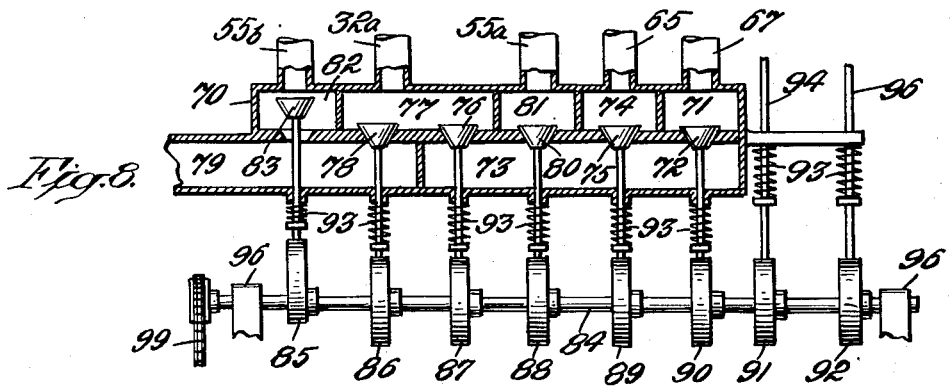
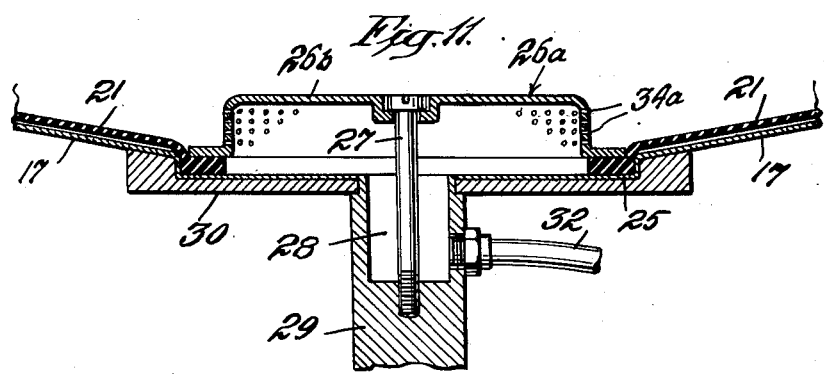
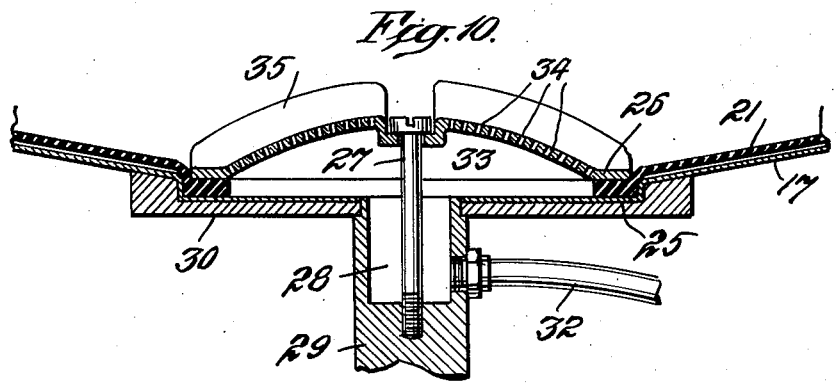

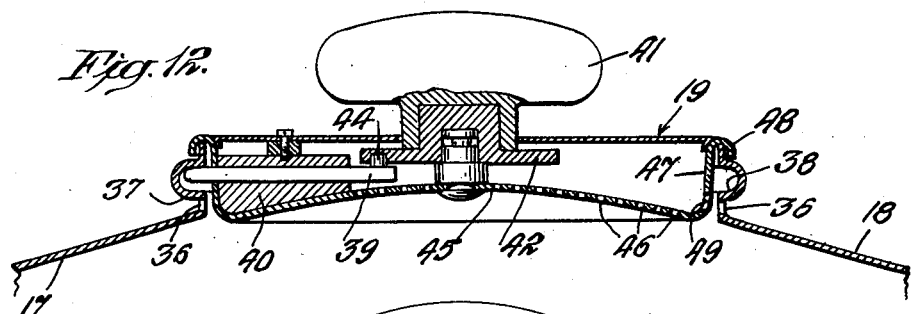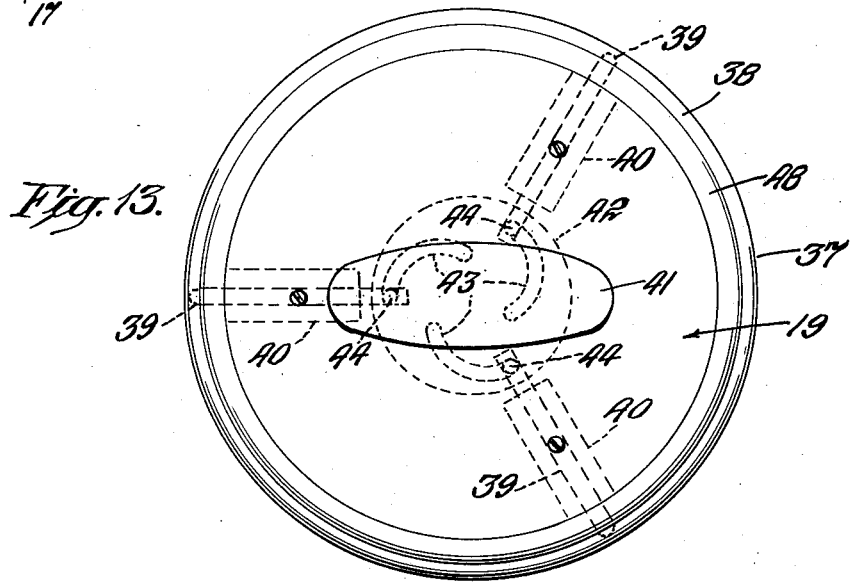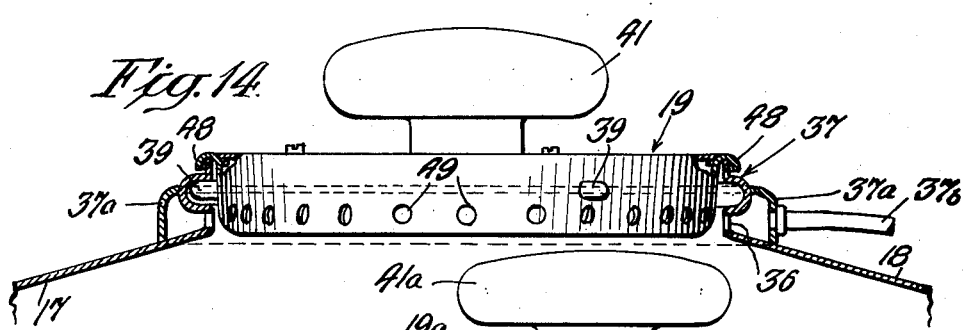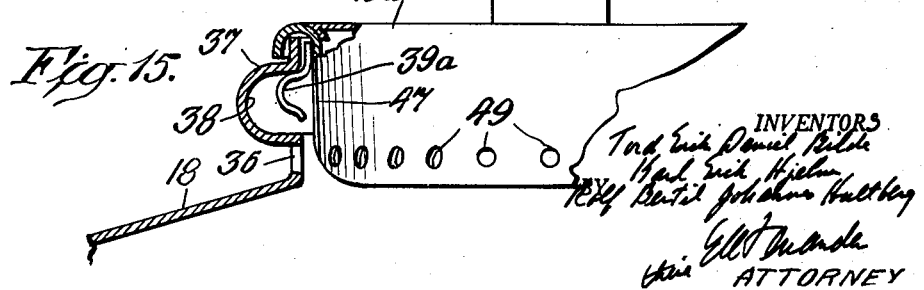

Patented Apr. 20, 1954

2,676,088

UNITED STATES PATENT OFFICE 2,676,088

METHOD OF WASHING, RINSING, AND SQUEEZE DRYING CLOTHES

Tord Erik Daniel Bilde, Karl Erik Hjelm, and Rolf Bertil Johannes Hultberg, Stockholm, Sweden, assignors to Aktiebolaget Elektrolux, Stockholm, Sweden, a corporation of Sweden Application June 30, 1949, Serial No. 102,362

3 Claims. (Cl. 8—159)

Our invention relates to a method of washing and rinsing clothes and other textile materials and extracting liquid therefrom.

An object of our invention is to provide an improvement for washing laundry in which the clothes and other textile materials being washed are not subjected to any appreciable compressive forces until the washing and rinsing periods have been completed.

Another object of our invention is to provide an improved method of washing laundry in which the clothes and other textile materials being washed are continuously agitated during the washing and rinsing periods and are not subjected to any appreciable compressive forces to extract liquid therefrom until the washing and rinsing periods are concluded.

A further object is to provide such an improved method in which the clothes and other textile materials being washed are freely agitated during the washing and rinsing periods and the wash and rinse water are withdrawn from the laundry in a manner to facilitate and promote removal of foreign matter and sediment with the withdrawn liquid before the clothes being cleansed are subjected to any compressive forces to extract liquid therefrom.

Further objects and advantages of our invention will become apparent as the following description proceeds, and the features of novelty which characterize our invention will be pointed out with particularity in the claims annexed to and forming a part of this specification.

In the drawings,

Fig. 2 is a view diagrammatically illustrating apparatus generally like that shown in Fig. 1 and control mechanism therefor;

Figs. 4 to 8 are further diagrammatic views of the control mechanism of Fig. 2 to illustrate the invention more clearly;

Fig. 9 is a fragmentary schematic view of the control mechanism diagrammatically shown in Fig. 7 to illustrate a detail of the invention;

Fig. 10 is an enlarged fragmentary sectional view of the apparatus shown in Fig. 1 to illustrate the construction more clearly;

Fig. 11 is an enlarged fragmentary sectional view generally like that shown in Fig. 10 illustrating a modified construction of the apparatus of Fig. 1;

Fig. 12 is an enlarged fragmentary sectional view of the apparatus shown in Fig. 1 to illustrate details of construction;

Fig. 13 is a top plan view of the details shown in Fig. 12;

Fig. 14 is a sectional view generally similar to Fig. 12 illustrating a modified construction;

Fig. 15 is a fragmentary sectional view of parts like those shown in Fig. 12 illustrating another modified construction.

Figure 1:
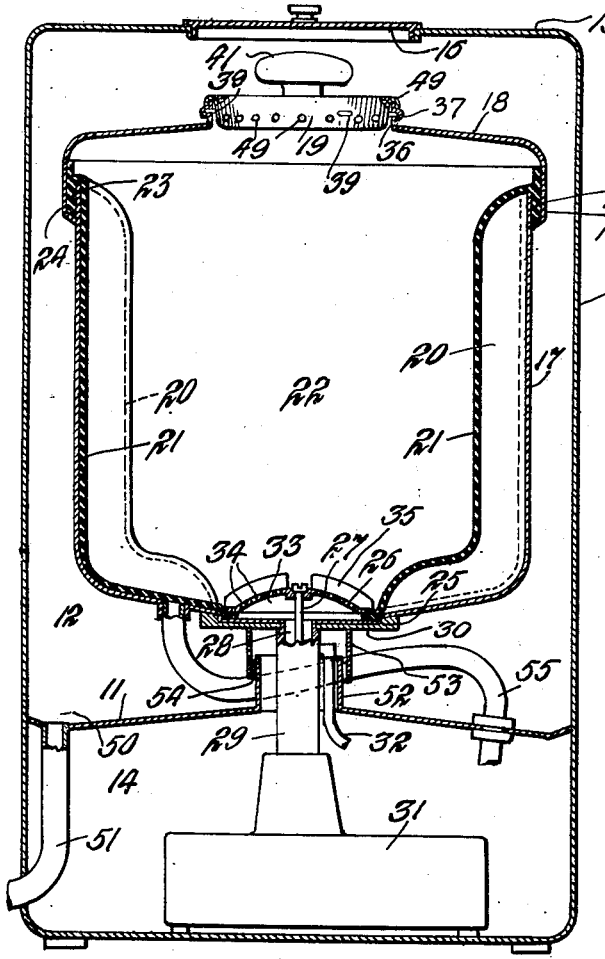
Fig. 1 is a vertical sectional view illustrating a combined washing, rinsing and liquid extracting apparatus embodying the invention.

In Fig. 1 we have shown our invention embodied in a combined washing, rinsing and liquid extracting apparatus comprising an outer shell or casing 10 having a horizontally disposed partition 11 therein to form upper and lower compartments 12 and 14, respectively, and an apertured top 15 formed to receive a cover or lid 16.

Within the upper compartment 12 is disposed a container or shell 17 of cylindrical form having an apertured top 18 formed to receive a lid or cover 19 which is in alignment with and directly beneath the cover 16 of the outer casing 10. The container 17 is provided with inwardly extending ribs or vanes 20 which are diametrically opposite one another, and within the container is fixed a flexible liner 21 which is formed of suitable resilient material, such as rubber, for example, such liner and parts of the container 17 defining a receptacle 22 in which washing and rinsing of clothes and other textile material are effected.

In its fully expanded position the liner 21 is closely adjacent to and bears against the inner wall surface of the container 17, the liner being formed with vertically extending U-shaped bends or folds which overlie the ribs or vanes 20. This is clearly brought out in Fig. 1 in which the part of container 17 at the left-hand side of the vertical axis is a sectional view taken at a region removed from one rib 20 and the part thereof at the right-hand side of the vertical axis is a sectional view taken at a region immediately adjacent a face of the other rib 20.

The upper peripheral edge of the liner 21 is formed with an enlarged collar 23 which is anchored or otherwise suitably fixed in position between the upper end of the side wall of the container 17 and a downwardly depending flange or skirt 24 of the top 18. The bottom of the liner 21 is formed with an opening at the peripheral edge of which is also provided a collar 25 fixed in position between the edge of a plate 26 and the bottom of the container 17, as best shown in Fig. 10. This may be accomplished by providing a threaded cap or stud 27 which cooperates with a threaded opening in the bottom of a recess or chamber 28 formed at the upper part of a vertical shaft 29, the head of the stud 27 acting at a center region of the plate 26 to draw the latter tightly against the lower collar 25 of the liner 21.

To the bottom of the container 17 is welded a ring-shaped plate 30 whose inner peripheral edge is fixed to the upper end of shaft 29, thereby providing a rigid mounting for the container. The shaft 29 extends vertically downward through an opening in the partition 11 and is journaled in any suitable manner in a housing 31 disposed in the lower compartment 14 of the outer casing 10. The housing 31 is adapted to contain mechanism of any conventional type operable to oscillate the shaft 29, such mechanism including suitable driving means, such as an electric motor, for example.

Liquid is introduced into and withdrawn from the receptacle 22 at a first level which is always at the extreme bottom thereof. As best shown in Figs. 1 and 10, liquid is supplied through a conduit 32 to the recess 28 in the upper part of shaft 29 and passes therefrom into a chamber 33 at the underside of the convex-shaped plate or cap 26 which is formed with a multiplicity of apertures 34. When liquid is withdrawn from the receptacle 22, the liquid passes through the apertured plate 26 which then essentially serves as an outlet drain, such liquid draining by gravity flow through chamber 33, recess 28 and conduit 32 to waste, as will be explained more fully hereinafter. To insure free draining of liquid from the receptacle 22, upright ribs 35 are provided at the top face of the apertured plate 26. In this manner clothing and other textile material in the receptacle 22 is prevented from clogging the apertures 34, the ribs 35 being effective to act on the clothing due to the oscillatory movement imparted thereto.

In addition to the bottom outlet drain 26, the apparatus also embodies provisions for removing liquid from the upper part of the receptacle 22 at a higher level than the bottom drain outlet. As best shown in Figs. 1 and 12, a multiplicity of overflow openings 36 forming a drain outlet are provided about the base of the neck portion 37 at the upper open end of the container 17. The neck portion 37 is formed with a groove 38 adapted to receive the outer ends of locking bolts 39 radially movable within the cover 19. As seen in Figs. 12 and 13, each bolt 39 is movable lengthwise in an apertured slide block 40, such blocks being fixed in position in the hollow interior of the cover 19.

The cover 19 is provided with a rotatable knob 41 to which is fixed a circular plate 42 whose bottom face is formed with grooves 43 adapted to receive pins 44 fixed to the inner ends of the bolts 39. The pins 44 are adapted to ride in the grooves 42 which are of such shape that, when the knob 41 is rotated back and forth, the bolts 39 move radially outward and inward, respectively, the outward movement being such that the extreme outer ends of the bolts will snugly fit into the annular groove 38 to lock the cover 19 securely in position.

The cover 19 includes a concave-shaped inner plate 45 having a multiplicity of openings 46, and a vertically extending side wall 47 whose upper end is bent to form an inverted U-shaped flange 48 which is adapted to rest on the neck portion 37 of the container 17. A multiplicity of openings 49 are also formed about the lower end of the cover 19 of the side wall 47 of the cover 19, such openings 49 being more or less directly opposite the openings 36 in the neck portion 37.

Liquid discharged through the drain openings 36 at the top 18 of container 17 flows over the latter and collects in the trough 50 formed at the upper side of the partition 11, the latter sloping downwardly toward the side wall of the outer shell 10. A conduit 51 is connected to an outer region of parition 11 to drain liquid from the trough 50 to waste. In order to protect the mechanism in the lower compartment 14, a suitable liquid seal is provided in the partition 11 at the region the shaft 29 extends therethrough. As shown in Fig. 1, an upright flange 52 is provided at the central opening in partition 11 which overlaps a second flange 53 depending downwardly from the plate 30. Suitable packing 54 may be retained in any suitable manner in the annular gap between the flanges 52 and 53.

The appartaus of Fig. 1 also embodies provisions for collapsing the inner liner 21 to extract liquid from clothes disposed therein. This may be accomplished by providing a liquid supply conduit 55 which is connected to the bottom of container 17. When liquid is admitted under pressure through conduit 55 into the space between the container 17 and liner 21, the latter is compressed so that liquid will be extracted from clothing being washed in the liner.

In the apparatus of Fig. 1 the liquid employed for collapsing liner 21 also drains from the container 17 through conduit 55, as will be explained more fully hereinafter. Both the conduits 32 and 55 are formed of flexible tubing, such as rubber hose, for example, so that the container 17 can freely oscillate back and forth when such movement is imparted thereto.

In Fig. 2 we have diagrammatically illustrated apparatus generally like that shown in Fig. 1 and control mechanism associated therewith to control and regulate the supply of liquid to effect washing, rinsing and extraction of liquid. In order to simplify Fig. 2, the outer casing and mechanism for oscillating the container 17 have been omitted.

The control mechanism provided comprises valves 60 and 61 connected in conduits 62 and 63, respectively, the conduits 62 and 63 being connected to sources of supply of cold and hot water, respectively. The conduit 62 is provided with a downwardly directed nozzle 64 which is in alignment with and spaced from the upper end of a vertical conduit 65. Similarly, the conduit 63 is provided with a downwardly directed nozzle 66 which is in alignment with and spaced from the upper end of a vertical conduit 67. Hence, the discharge nozzles 64 and 66 are separated from the conduits 64 and 67, respectively, by air gaps 68 and 69.

A housing 70 partitioned to form a number of chambers and having valves therein may be provided to control and regulate the flow of cold and hot water from the vertical conduits 65 and 67. The lower end of hot water conduit 67 is connected to a chamber 71 having a valve 72 for regulating flow of hot water into an inlet manifold 73. Similarly, the lower end of cold water conduit 65 is connected to a chamber 74 having a valve 75 for regulating flow of cold water into the inlet manifold 73. A valve 76 controls flow of water from inlet manifold 73 into a chamber 77 from which water can pass through a conduit 32a into the lower open end of the receptacle 22 defined in part by the flexible liner 21. Further, chamber 77 is provided with a valve 78 for draining water from receptacle 22, such water flowing from chamber 77 into an outlet manifold 79 from which water can flow to waste.

Fig. 2 differs from Fig. 1 in that separate conduits 55a and 55b are provided for supplying liquid to and withdrawing liquid from the space between the container 17 and flexible liner 21 therein. A valve 80 controls flow of water from inlet manifold 73 into chamber 81 to which is connected conduit 55a for conducting water into the space between container 17 and liner 21. Water from such space flows through conduit 55b into chamber 82, such chamber having a valve 83 for controlling flow of water therefrom into the outlet manifold 79.

Suitable mechanism is provided to actuate the valves just described in a desired manner to effect washing and rinsing of clothes being washed in receptacle 22, and also to extract liquid from the clothes. As diagrammatically shown, such mechanism may comprise a shaft 84 upon which are fixed a number of cams, 85 to 92. The stem of each valve in the housing 70 is arranged to cooperate with one of the cams 85 to 90, resilient means 93 being provided to bias the valves to their closed positions. The water valves 60 and 61 are provided with operating members connected to the upper ends of rods or connections 94 and 95, the lower ends of which cooperate with cams 91 and 92. The water valves 60 and 61 are also biased to their closed positions by resilient means 93 associated with each of the connections 94 and 95.

The cam shaft 84 is journaled at 96 and may be arranged to be driven in any suitable manner. Mechanisms of this type are well known and usually referred to as "timer mechanism." Such a timer may be associated with the driving means employed to drive the container 17 or a separate electric timer motor 97 may be provided, as shown in Fig. 2. The timer motor 97 is connected to suitable reduction gearing 98 which in turn is connected by a sprocket and chain connection 99 to the cam shaft 84.

By providing air gaps 68 and 69 between the nozzles 64 and 66 and the upper ends of conduits 65 and 67, a simple expedient is provided to meet plumbing regulations so that there will never be any likelihood of wash or rinse liquid being drawn back into the water supply conduits 62 and 63 due to a reduction in water pressure in the latter. In the operation of the washing machine, particularly when it is desired to collapse the liner 21 by admitting water into the space between the container 17 and liner 21, it is desirable to supply such water under adequate pressure. It has been found that, even though the air gap 68 is provided in the cold water supply line, adequate water pressure is obtained to cause the inner liner 21 to collapse under conditions usually encountered in dwellings which are supplied by a city water system. In order to insure adequate water pressure to cause the inner liner 21 to collapse under the most adverse conditions encountered, a pump 100 may be connected in conduit 65 to pump water under sufficiently high pressure into the space between the container 17 and liner 21 when it is desired to collapse or compress the liner at a relatively high pressure.

When it is desired to employ the washing apparatus of Figs. 1 and 2 for washing clothes or other textile material, the lids or covers 16 and 19 are removed and the clothes to be washed are placed in the receptacle 22. At this time all of the valves may be in the closed position shown in Fig. 2. A suitable detergent can be sprinkled over the clothes and the cover 19 locked in position.

The timer motor 97 is then connected to a suitable source of electrical supply, as by a switch operating member, for example, to impart rotating movement to cam shaft 84. The motor for driving the mechanism in housing 31 to cause the container 17 to oscillate may also be connected to the same electrical circuit as the timer motor 97, so that the closing of a single switch will actuate the cam shaft 84 and also start oscillation of the container 17.

Upon actuating the cam shaft 84 the cams thereon rotate whereby cam 92 becomes effective to open hot water valve 61, cam 90 becomes effective to open valve 72, and cam 87 becomes effective to open valve 76. As shown in Fig. 4, such open positions of valves 61, 72 and 76 allow hot water to flow from conduit 63 into conduit 67 and from the latter into the receptacle 22 in a path of flow which includes chamber 71, inlet manifold 73, chamber 77, and conduit 32a through the drain openings 34 in the plate 26. The control for admitting hot water in the manner just described desirably is so adjusted that hot water will rise within the liner 21 to a definite level therein, such as the liquid level 101 indicated in Fig. 2. When the hot water reaches the liquid level 101, the cam shaft 84 will have rotated sufficiently so that all of the valves will again assume the closed positions shown in Fig. 2.

The container 17 continues to oscillate back and forth to effect washing of the clothes, the ribs 20 serving to agitate the clothes and washing liquid therein. During such washing period the inner liner 21 is in the fully expanded position shown in Fig. 1, that is the liner is closely adjacent to and bears against the inner wall surface of the container 17 and the vertical folds of the liner overlie and hub the vanes or ribs 20.

At the termination of the washing period which is dependent upon the adjustment of the control mechanism, the cam shaft 84 will have rotated sufficiently whereby cam 86 becomes effective to open valve 78, as shown in Fig. 5, the other valves all remaining in their closed positions. The opening of valve 78 permits washing liquid to flow from within the liner 21 through the drain openings 34 in plate 26, conduit 32a, chamber 77, and outlet manifold 79 to waste. During such draining of washing liquid the container 17 continues to oscillate back and forth, thereby facilitating the removal of heavy sediment and foreign matter which tends to settle at the bottom of the liner 21 in the vicinity of the drain openings 34 in plate 26. Also, the continued back and forth movement of the container 17 imparts a similar oscillating movement to the upright ribs 35 on plate 26, so that the drain openings 34 will not become clogged by clothing and will allow washing liquid to flow freely from the interior of the liner 21.

After an interval of time sufficient to allow substantially all of the washing liquid to drain from the interior of liner 21, the cam shaft 84 will have rotated such a distance that the cams 92, 99 and 87 again become effective to open valves 61, 72 and 76, respectively. Such open positions of the valves just-mentioned are shown in Fig. 4, whereby hot rinse water is supplied to the interior of liner 21 through the bottom openings 34 in the same manner that hot washing water is admitted, as previously described. The control is so adjusted that hot rinse water will rise in the liner 21 to a definite level which may be the same level 101 to which the hot washing water rises therein. During such admission of hot rinse water the container 17 continues to oscillate to promote effective rinsing of the clothes being washed. When the hot rinse water reaches the level 101, for example, the cam shaft 84 will have rotated sufficiently to cause all of the valves to remain in their closed positions indicated in Fig. 2. The interval of time required for the initial hot water rinsing of the clothes being washed may vary and take from 2 to 4 minutes, for example, and thereafter the cam shaft 84 will have rotated sufficiently to open valve 78 again, as indicated in Fig. 5. Since all of the remaining valves are closed, the initial hot rinse water drains from the liner 21 through the openings 34 in plate 26 to waste in the same manner as the washing liquid, as described above. During such draining of hot rinse water the container 17 continues to oscillate to promote thorough rinsing of the clothes and thorough removal of solid and foreign matter. It is to be understood that in such initial hot water rinse the liner 21 is still in its fully expanded position and the rinse water can drain freely through the drain openings at the bottom of the liner.

After an interval of time sufficient for substantially all of the hot rinse water to drain from within liner 21, the cam shaft 84 will have rotated such a distance that cam 91 becomes effective to open cold water valve 62, cam 89 becomes effective to open valve 75 and cam 87 becomes effective to open valve 76, as shown in Fig. 6. Such open positions of valves 62, 75 and 76 allow cold rinse water to flow from conduit 62 into conduit 65 and from the latter into the liner 21 in a path of flow which includes chamber 74, inlet manifold 73, chamber 77 and conduit 32a through the drain openings 34 in plate 26. The control is so adjusted that cold rinse water will rise in the liner 21 to a definite level which may be the same level 101 to which the hot rinse water rises therein. During such admission of cold rinse water the container 17 continues to oscillate to promote effective rinsing of the clothes in the liner 21.

When the cold rinse water reaches the level 101, for example, the cam shaft 84 will have rotated sufficiently to cause all of the valves to remain in their closed positions indicated in Fig. 2. After an adequate interval of time sufficient to effect good rinsing action in a body of rinsing liquid essentially different from the initial body of rinsing liquid, the cam shaft 84 will have rotated such a distance to cause valve 78 to open while the remaining valves stay in their closed positions, as indicated in Fig. 5. Under these conditions cold rinse water drains from the liner 21 through the drain openings 34 in plate 26 to waste in the same manner as the hot rinse water, as described above. During such draining of cold rinse water the container 17 continues to oscillate to promote effective rinsing of the clothes.

The control provided may be constructed to effect a number of cold water rinses in essentially different bodies of liquid, in the manner just described. Hence, the cam system may be constructed to provide for as many as four cold water rinses, for example. In each cold water rinse cold water is supplied to the interior of liner 21 and subsequently drained from the bottom thereof in the same manner as the initial cold water rinse described above.

After the final cold water rinse in which the rinse water is drained from the bottom drain openings 34, the cam shaft 84 rotates such a distance that valves 60, 75 and 76 again open to allow cold water to enter the interior of the liner through the bottom drain openings 34, as indicated in Fig. 6. During this rinsing period of the washing cycle the valves 60, 75 and 76 remain open for a considerably longer interval of time than the cold water rinses previously described, whereby cold water rises in the receptacle 22 until it reaches the underside 45 of the cover 19 and passes through the drain openings 36 in the open neck portion 37 of the container 17, such discharge openings being below the top edge of the container 17. Cold rinse water can also pass through the openings 46 at the underside 45 of the cover into the interior thereof, and such water passes through the openings 49 in the side wall 47 of the cover and is also discharged through the drain openings 36 in the neck portion 37.

The overall area of the discharge openings 36 forming the top drain outlet is sufficiently large so that the clothes being washed are not subjected to any appreciable pressure during rinsing. In this way light sediment, scum and foreign matter which tends to rise to and float at the liquid surface level is effectively carried away with the rinse water discharged through the drain openings 36 at the uppermost part of container 17. The fresh rinsing liquid supplied to the receptacle 22 at the extreme bottom thereof displaces liquid in the receptacle and causes the displaced liquid to move in a generally upward direction through the laundry from a first level at the extreme bottom of the receptacle to the drain openings 36 at the higher level and overflow from the receptacle at the top thereof.

After an adequate interval of time sufficient to carry away such light sediment, the cam shaft 84 will have turned such a distance that the valve 76 moves to its closed position and valve 78 opens, whereby the cold rinse water held in the receptacle 22 commences to drain through the drain openings 34 to waste in the same manner as previously described in connection with the hot and initial cold water rinses. Simultaneously with the closing of valve 76 and opening of valve 78, cam 88 becomes effective to open valve 80, whereby the valves are in the position indicated in Fig. 7. When this occurs cold water passes from conduit 65 into the space between the container 17 and inner liner 21 in a path of flow which includes chamber 74, inlet manifold 73, chamber 81 and conduit 55a. The water admitted into the space between the container 17 and inner liner 21 causes the latter to collapse and squeeze water from the clothes held therein.

As explained above, the water is usually supplied under adequate pressure into the space between the container 17 and liner 21 to compress the latter even though an air gap 68 is provided between the nozzle 64 and upper end of conduit 65. Under such conditions the kinetic energy of the stream of water discharged into the upper end of vertical conduit 65 is converted to static pressure which is effective to cause the inner liner 21 to be compressed against the clothes held therein, as more or less diagrammatically indicated in Fig. 2. During this period of the washing cycle, the valves are in the positions indicated in Fig. 7, as previously described.

When no pump is employed to boost the pressure of the water supplied to the space between the container 17 and inner liner 21, the latter is compressed sufficiently to squeeze water from the clothes to a degree which will permit handling of the clothes without objectionable dripping. In other words, moisture is partially extracted from the clothes so that they are suitably dry for hanging on a line for further drying.

It may be desirable to extract water from the clothes to an even greater extent than that effected when no pump is employed in the cold water supply line. In such case the pump 100 may be connected in the conduit 65 which becomes operable toward the end of the liquid extracting period. As shown in Figs. 7 and 8, this may be accomplished by providing an additional cam 102 on cam shaft 84 which cooperates with a member 103 to which is fixed a contact 104. The contact 104 is suitably insulated from member 103 and cooperates with another fixed contact 105. When the contacts 104 and 105 are closed an electrical circuit is completed through conductors 106, 107 and 108 to an electric motor 109 arranged to drive pump 100, thereby boosting the pressure at which water is supplied to the space between the container 17 and inner liner 21.

When the liquid extracting period is initiated, the cam 102 is ineffective to close contacts 104 and 105, so that motor 109 is deenergized and pump 100 remains inactive. However, as the cam shaft 84 turns during the liquid extracting period and toward the latter part thereof, the cam 92 becomes effective to close contacts 104 and 105, thereby completing the electrical circuit for motor 109 to drive pump 100. The pump 100 may be of any conventional type which can be regulated and operable to boost the water pressure as high as 115 pounds per square inch, if desired. When pump 100 is rendered operable, the final extraction of liquid from the clothes takes place for a sufficient interval of time.

At the conclusion of the liquid extracting period the cam shaft 84 will have moved such a distance that cam 85 becomes effective to open valve 83, the other valves all remaining in their closed positions, as indicated in Fig. 8. Under these conditions water drains from the space between the container 17 and inner liner 21, such water flowing through conduit 55b, chamber 82, and outlet manifold 79 to waste. When this occurs the timer motor 97 and main motor for driving the mechanism in housing 31 are deenergized to complete the washing cycle. This may be accomplished in any suitable manner, such as, for example, by fixing an electrically conductive disc on cam shaft 84 which is insulated therefrom and connected in the electrical circuit for the timer motor and main motor. Such electrical circuit may include a brush which is arranged to bear against a peripheral edge portion of the disc which includes an insulated portion so that, when the washing cycle is completed, the brush rides onto such insulated portion to disconnect the timer motor and main motor and render them inoperable.

When the apparatus comes to a stop at the conclusion of the liquid extracting period, the outer lid 16 can be removed and then the inner cover 19 can be unlocked to withdraw the washed clothes from the receptacle 22. The inner liner 21 can then be pressed outwardly to its fully extended position so that it will occupy the position shown in Fig. 1 and be ready for the next washing cycle. The switch operating member for energizing the timer and main motors may be operatively associated with the electrical circuit for these motors in any suitable manner so that, when such operating member is actuated, the cam shaft 84 will again start rotating and the container 17 will start oscillating for the next washing cycle.

In the embodiment diagrammatically illustrated in Fig. 2, it will be understood that the conduits 32a, 55a and 55b are flexible connections to permit the container to oscillate freely back and forth in the manner described above in connection with the embodiment of Fig. 1. The control for regulating flow of hot and cold water to the apparatus of Fig. 1 may be like that shown in Fig. 2 and other figures and differs therefrom only in providing suitable valve controls to enable the use of a single flexible conduit 55 for admitting water into and draining water from the space between the container 17 and inner liner 21. Such a valve arrangement is shown in Fig. 3 in which valves 80a and 83a take the place of valves 81 and 83 in Fig. 2.

Figure 3:
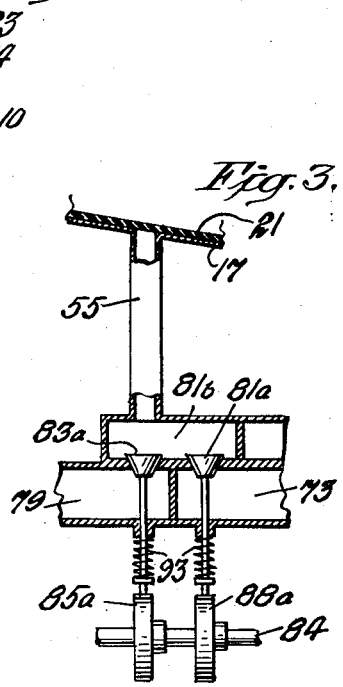
Fig. 3 is a fragmentary view diagrammatically illustrating details of control mechanism like that shown in Fig. 2 which is applicable to the embodiment of Fig. 1.

During pressure squeezing of the clothes in the embodiment of Fig. 1, cam 88a in the control arrangement of Fig. 3 becomes effective to open valve 81a whereby cold water is admitted into the space between container 17 and inner liner 21 in a path of flow which includes inlet manifold 73, chamber 81b and conduit 55. At the termination of the liquid extracting period valve 81a closes and cam 85a then becomes effective to open valve 83a thereby enabling water to drain from the space between container 17 and inner liner 21 to waste in a path of flow which includes conduit 55, chamber 81a and outlet manifold 79.

In view of the foregoing it will now be understood that, during and after the washing period and all of the rinsing periods except the last or final rinsing period, the clothes being washed are not subjected to any appreciable compressive forces. In other words, in the embodiments described above the inner liner 21 remains in its fully extended position during the washing period and all of the rinsing periods. Only at the completion of the final rinsing period, at which time rinse water drains or overflows at the top of the container 17 and the withdrawal of liquid from the receptacle 22 at the bottom thereof is initiated, is the inner liner 21 subjected to compressing action to squeeze water from the clothes being washed.

Accordingly, during the washing period and rinsing periods where the receptacle 22 is not completely filled with liquid, a free liquid surface level is maintained whereby the clothes being washed can be freely agitated at all times during such rinsing periods as well as during the washing period. In this way soapy water and solid matter can freely pass downwardly through the liquid body and pass through the drain opening at the bottom of the receptacle, so that the likelihood of trapping and infiltrating of soap impurities and foreign matter in the clothes is substantially avoided.

When the final continuous rinse is effected, at which time the receptacle becomes completely filled with liquid and drains or overflows at the top of the container, light sediment, scum and other foreign matter which tends to float at the top of the liquid body, is effectively carried away before the compressing action takes place at the completion of such final rinsing period. It is for this reason that the overall area of the outlet openings at the discharge or drain provided at the top of container 17 is sufficiently large so that, during the final continuous rinse, the clothes being washed are not subjected to any significant pressure.

By agitating the clothes being washed more or less freely during and after the washing and rinsing periods, and only subjecting the clothes to compressive force at the conclusion of the rinsing period, the likelihood of producing stains or spots on clothing is avoided. Such stains or spots are often produced on clothes and other textile material being washed when the latter are subjected to compressive forces immediately after the washing period and initial stages of the rinsing period before the laundry has been thoroughly rinsed and cleansed. This is so because any foreign matter and soap impurities that remain in the wash and rinse liquid tend to stick and adhere to the clothes, especially in an interior part of a washing load removed a considerable distance from a discharge point. When clothes are subjected to compressive forces while foreign matter and soap impurities adhere to the clothes being cleansed, there is always the likelihood of producing stains and spots on clothing. This is particularly true when clothes being washed are subjected to such compressive forces of high magnitude where there is a tendency to produce folds and wrinkles in the clothes. When the clothes being washed are subjected to compressive forces only after the conclusion of the washing and rinsing periods, the wear and tear on the clothes is substantially reduced. The wear and tear on clothes being washed often becomes excessive where the clothes are subjected to compressive forces of high magnitude a number of times before the washing and rinsing periods are concluded.

During the compressing period when the inner liner collapses, the liquid in the receptacle drains through the bottom drain openings. Such draining of the final rinse water commences immediately at the beginning of the compressing period. During such compressing period liquid extracted from clothes can also pass or drain through the overflow provided at the top of the washing receptacle. The drain openings provided at the bottom of the receptacle desirably are not too large and sufficiently small so that, when the clothes being washed are compressed, such openings cannot injure the clothes or other textile material.

While the embodiments described above may be operated without a pump to increase the water pressure, it should be understood that such a pump may be employed not only to supply water into the space between the container 17 and inner liner 21, but also to the receptacle 22 through the bottom drain openings, especially during the final continuous rinsing period when overflow of liquid takes place at the top of the container 17.

In Fig. 11 is illustrated another manner in which the drain openings may be provided at the bottom of the container 17. The plate 26a differs from the plate 26 previously described in that it is formed with a top flat portion 26b and a downwardly extending side wall in which the drain openings 34a are provided. By providing the openings 34a in a vertically extending wall, the likelihood of clogging the openings when liquid drains therethrough is substantially avoided.

In the embodiments described it has been stated that the overflow openings 36 forming the top drain are formed in the open neck portion 37 at the top of the container 17. If desired, the cover for the container 17 may essentially comprise an apertured plate like the plate 45 in Fig. 12 which is locked in position in any suitable manner and through the openings of which liquid overflows directly onto the top of the container 17. Another construction is shown in Fig. 14 which is similar to the embodiment of Fig. 12 and differs therefrom in that a manifold or hollow ring 37a is formed about the neck portion 37 at the top of the container and fixed thereto, as by brazing, for example. In such construction liquid discharges through the top drain openings 36 into the hollow ring or drain manifold 37a to which a flexible hose 37b may be connected to lead overflow liquid to the pipe 51 shown in Fig. 1 or directly to waste, if desired. It should also be evident that a pump may be provided which operates continuously during the washing cycle to pump liquid from outlet manifold 79 and overflow liquid from the top of container 17, such pump having a suitable connection to conduct liquid to a desired discharge point.

Instead of providing the locking provisions shown in Fig. 12 for locking the cover 19 in position at the top of container 17, the cover may be provided with suitable resilient means or springs operable to hold the cover locked in position, the cover in such case being removable when force is applied against the tension of the resilient means. A cover 19a embodying such construction is shown in Fig. 15 in which a number of spring clips 39a are fixed to the side wall 47 in spaced apart relation. When the cover 19a is fixed in position at the top of container 17, the spring clips 39a yield sufficiently so that they will pass through open neck portion 37 and snugly fit within the upper part of the annular groove 38. The cover 19a is provided with a suitable knob 41a to enable the cover to be removed against the tension of the spring clips 39a.

Figure 17:
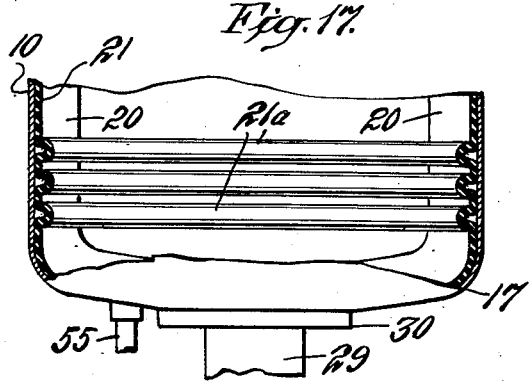
Figs. 16 and 17 are horizontal and vertical sectional views, respectively, of the upper and lower parts of apparatus generally like that shown in Fig. 1 illustrating further modifications of the invention.

The inner liner 21 formed of resilient material desirably should not be unduly stretched or elongated when it is collapsed to extract liquid from clothes being washed. This can be readily accomplished by increasing the linear vertical distance of the liner so that it is greater than the distance along the inner wall surface of the container 17 between the upper and lower regions to which the liner is fixed thereto. One manner of increasing the vertical linear distance of the inner liner is shown in Fig. 17 in which the inner liner 21 is formed with horizontally disposed folds 21a at the bottom part thereof. When such folds 21a are provided the inner liner can be elongated a considerable distance in a vertically extending direction during the compressing period of the washing cycle, and an adequate number of such folds can be provided to prevent objectionable stretching of the liner for the maximum washing load the washing receptacle can handle.

Figure 16:
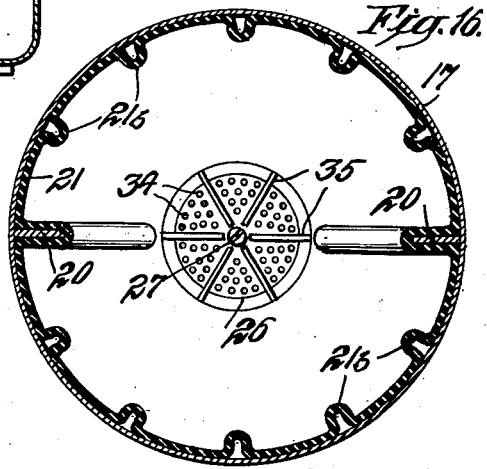

Similarly, vertically disposed folds 21b may be provided at the upper part of the liner 21, as shown in Fig. 16. If desired, the inner liner may be formed with both vertical and horizontal folds.

Although we have shown and described several embodiments of our invention for washing and rinsing clothes and extracting liquid therefrom, we do not desire our invention to be limited to the particular arrangements set forth. For example, the clothes to be washed may be subjected to a soaking period in any suitable manner before starting the washing period of the washing cycle. Also, the hot washing liquid can be introduced manually in the washing receptacle through the open top of the container to prepare clothing for the washing period, and automatic operation of the washing cycle can commence in the initial hot water rinsing period of the washing cycle. Further, instead of oscillating the container and resilient inner liner therein to effect agitation of the clothes being washed, the container and liner therein may be stationary and a suitable agitator provided within the inner liner. Therefore, we intend in the claims to cover all modifications which do not depart from the spirit and scope of our invention. However, reference is made to our copending divisional application Serial No. 242,822, filed August 21, 1951, which contains claims directed to apparatus features disclosed in the instant application but not claimed herein.

What is claimed is:

1. In the art of cleansing laundry in which a batch of the laundry in a place is agitated in washing liquid and thereafter thoroughly wetted in rinsing liquid, the improvement which comprises successively rinsing the laundry a number of times or periods in essentially different bodies of liquid in which the liquid is always supplied to the place at the bottom thereof, withdrawing all of the liquid from the place at the bottom thereof at the end of one rinse period, supplying rinsing liquid during at least one of the subsequent rinsing periods for a sufficient interval of time to cause overflow of liquid from the place at the top thereof, withdrawing liquid from the place at the bottom thereof when the supply of liquid to cause such overflow is terminated, agitating the body of rinsing liquid and laundry therein during said one rinsing period and each subsequent rinsing period, and in the entire cleansing operation subjecting the laundry in the place for the first time to appreciable compressive force to abstract liquid therefrom when all of the rinsing periods are substantially completed including the rinsing period for which rinsing liquid is supplied to cause overflow of liquid from the place at the top thereof.

2. In the art of cleansing laundry in which a batch of the laundry in a place is agitated in washing liquid and thereafter thoroughly wetted in rinsing liquid, the improvement which comprises successively rinsing the laundry a number of times or periods in essentially different bodies of liquid in which the liquid is always supplied to the place at the bottom thereof, withdrawing all of the liquid from the place at the bottom thereof at the end of the initial rinse period, supplying rinsing liquid during at least the final rinse period for a sufficient interval of time to cause overflow of liquid from the place at the top thereof, withdrawing liquid from the place at the bottom thereof when the supply of liquid to cause such overflow is terminated, agitating the body of rinsing liquid and laundry therein during the initial rinse period and each subsequent rinse period, and in the entire cleansing operation subjecting the laundry for the first time to appreciable compressive force to abstract liquid therefrom substantially at the conclusion of the final rinse period after rinsing liquid is supplied to cause overflow of liquid from the place at the top thereof and when the withdrawal of liquid from the place at the bottom thereof is initiated.

3. In the art of cleansing laundry in which a batch of laundry in a place is agitated in washing liquid and thereafter thoroughly wetted in rinsing liquid, such agitation and wetting of the laundry successively in washing liquid and rinsing liquid constituting washing and rinsing steps, respectively, the improvement which comprises supplying rinsing liquid to a region of the place at a first level which is always at the extreme bottom thereof and overflow rinsing from the top thereof at a higher level so as to carry away foreign matter with the overflow liquid, whereby fresh rinsing liquid causes displaced liquid to move in a generally upward direction through the laundry in the place from the first level to the higher level and overflow from the place at the top thereof, agitating the rinsing liquid and laundry therein during such rinsing step, and in the entire cleansing operation including the washing and rinsing steps subjecting laundry in the place for the first time to an appreciable compressive force to abstract liquid therefrom when rinsing of the laundry is substantially completed.

References Cited in the file of this patent

UNITED STATES PATENTS

| Number | Name | Date |
|---|---|---|
| 1,411,286 | Lombard | Apr. 4, 1922 |
| 1,531,924 | Graham | Mar. 31, 1925 |
| 1,547,266 | Robe | July 28, 1925 |
| 2,161,208 | Soderholm | June 6, 1939 |
| 2,161,604 | Watts | June 6, 1939 |
| 2,407,660 | Graham | Sept. 17, 1946 |
| 2,416,611 | Castricone | Feb. 25, 1947 |
| 2,421,803 | Neal | June 10, 1947 |
| 2,472,682 | Rand | June 7, 1949 |

OTHER REFERENCES

Journal of the Textile Institute, June 1945, page 264.

Ullmann: Article in "The Textile Manufacturer," May 1942, page 210.